(12) United States Patent
Nakano et al.

(10) Patent No.: US 10,303,359 B2
(45) Date of Patent: May 28, 2019

(54) CHARACTER INPUT DEVICE AND INFORMATION PROCESSING DEVICE

(71) Applicant: OMRON Corporation, Kyoto (JP)

(72) Inventors: Mayu Nakano, Kyoto (JP); Takuya Nakayama, Kyoto (JP)

(73) Assignee: Omron Corporation, Kyoto (JP)

( * ) Notice: Subject to any disclaimer, the term of this patent is extended or adjusted under 35 U.S.C. 154(b) by 18 days.

(21) Appl. No.: 14/617,698

(22) Filed: Feb. 9, 2015

(65) Prior Publication Data

US 2015/0253986 A1  Sep. 10, 2015

(30) Foreign Application Priority Data

Mar. 4, 2014  (JP) .................................. 2014-041388

(51) Int. Cl.
*G06F 3/01* (2006.01)
*G06F 3/023* (2006.01)
(Continued)

(52) U.S. Cl.
CPC .......... *G06F 3/04886* (2013.01); *G06F 3/017* (2013.01); *G06F 3/0233* (2013.01);
(Continued)

(58) Field of Classification Search
CPC .. G06F 1/1673; G06F 3/0426; G06F 3/04886; G06F 3/04883
See application file for complete search history.

(56) References Cited

U.S. PATENT DOCUMENTS

| 6,271,835 B1 * | 8/2001 | Hoeksma | G06F 3/0236 345/168 |
| 8,316,319 B1 * | 11/2012 | Patel | G06F 3/04883 710/38 |

(Continued)

FOREIGN PATENT DOCUMENTS

| CN | 101384977 A | 3/2009 |
| CN | 102298461 A | 12/2011 |

(Continued)

OTHER PUBLICATIONS

Extended European Search Report issued in corresponding European Application No. 15154888.0 dated Jul. 7, 2015 (8 pages).

(Continued)

*Primary Examiner* — Kevin M Nguyen
(74) *Attorney, Agent, or Firm* — Osha Liang LLP

(57) ABSTRACT

A character input device that sets a keyboard image and an input character display area on a touch panel, the keyboard image including a plurality of character keys and that receives operation on the keyboard image. The character input device identifies a subregion including a touch detection point from among subregions set based on the defining information relating a character key detected to be touched, and sets a plurality of discriminating regions so that the discriminating regions are distributed based on the identified subregion. Each of the plurality of discriminating regions corresponds to the plurality of characters assigned to the character key. When a touch release is detected, a character that corresponds to the discriminating region including the detection point of the touch release is selected as an input character. The character is then displayed on the input character display area of the touch panel.

19 Claims, 11 Drawing Sheets

(51) Int. Cl.
*G06F 3/0488* (2013.01)
*G06F 3/0489* (2013.01)

(52) U.S. Cl.
CPC .......... *G06F 3/0236* (2013.01); *G06F 3/0237* (2013.01); *G06F 3/04883* (2013.01); *G06F 3/04897* (2013.01)

(56) References Cited

U.S. PATENT DOCUMENTS

| | | | |
|---|---|---|---|
| 8,949,743 B2* | 2/2015 | Kida | G06F 3/0234 715/773 |
| 2002/0027549 A1* | 3/2002 | Hirshberg | G06F 3/0234 345/168 |
| 2004/0212595 A1* | 10/2004 | Zhou | G06F 3/04886 345/168 |
| 2005/0129199 A1* | 6/2005 | Abe | G06F 3/0233 379/90.01 |
| 2006/0053387 A1* | 3/2006 | Ording | G06F 3/04883 715/773 |
| 2009/0140995 A1 | 6/2009 | Kang | |
| 2009/0167693 A1* | 7/2009 | Kuo | G06F 3/04886 345/168 |
| 2009/0265669 A1 | 10/2009 | Kida et al. | |
| 2010/0289749 A1* | 11/2010 | Ahn | G06F 3/0236 345/172 |
| 2011/0316791 A1 | 12/2011 | Jiang | |
| 2012/0050216 A1 | 3/2012 | Kremin et al. | |
| 2013/0021250 A1* | 1/2013 | Griffin | G06F 3/0236 345/168 |

FOREIGN PATENT DOCUMENTS

| | | |
|---|---|---|
| CN | 102662487 A | 9/2012 |
| CN | 102999288 A | 3/2013 |
| JP | 2000-029630 A | 1/2000 |
| JP | 2009-266236 A | 11/2009 |
| JP | 2013-081126 A | 5/2013 |
| TW | 200928875 A | 7/2009 |
| WO | 2011158064 A1 | 12/2011 |

OTHER PUBLICATIONS

Office Action issued in European Application No. 15154888.0, dated Jul. 18, 2018 (8 pages).
Office Action issued in Chinese Application No. 201510060962.0, dated Jan. 23, 2019 (22 pages).

* cited by examiner

✘ MARKED REGION IS INVALID

CHARACTER INPUT DEVICE AND INFORMATION PROCESSING DEVICE

BACKGROUND OF THE INVENTION

One or more embodiment of the present invention relate to a character input device having functions of: setting a keyboard image for character input and an input character display area on a touch panel; selecting an input character in response to operation of touching the keyboard image (hereinafter referred to as "touch") and to subsequent change in a touch position; and displaying the selected input character on the input character display area. One or more embodiment of the present invention also relate to an information processing device that performs information processing by using characters input with the character input device.

A small-size information processing device comprising a touch panel, such as a smartphone, sets a keyboard image and an input character display area on the touch panel for receiving character input. In the keyboard image, a plurality of character keys are arranged, and a plurality of characters are assigned to each of the character keys. A flick input method is adopted (see Patent Literatures 1 and 2). In this method, when a gesture of lightly sliding one's finger on a character key (flick gesture) is received, an input character is selected in accordance with the direction of the gesture.

A type of specific information processing executed in the flick input method is disclosed in Patent Literature 2. In this method, defining information (touch panel area information) is registered in advance for each character key. The defining information includes association between individual characters allocated to each character key and different regions on the touch panel. Upon detection of a touch gesture on the touch panel, the touch panel area information with respect to the touched key is compared with coordinates of the position where the finger is released from the panel, so that a flick direction is detected. A character associated with this flick direction is determined as an input character (see, for example, paragraphs 0032 to 0037 and FIGS. 2 to 5 in Patent Literature 2).

Patent Literature 3 discloses a technology as shown below. That is, a plurality of characters, which are associated with directional ranges different from each other, are assigned to each key. When a stylus pen is used, a vector representing a moving direction of the stylus pen is identified on the basis of both coordinates of a start point and an end point of a trace of the stylus pen, and the character associated with the directional range corresponding to the vector is selected (see, for example, paragraphs 0011 to 0017 and FIG. 8 in Patent Literature 3). When a flick gesture with a finger is made, a vector indicative of the flick direction may be identified in the same method as that in Patent Literature 3.

Patent Literature 1: Japanese Patent Application Laid-Open No. 2009-266236

Patent Literature 2: Japanese Patent Application Laid-Open No. 2013-81126

Patent Literature 3: Japanese Patent Application Laid-Open No. 2000-29630

SUMMARY

In Patent Literature 2, calculation of the vector indicative of the flick direction is replaced with the following process. In this process, characters assigned to a character key detected to be touched is associated with individual regions on the basis of the rule of flick input, and the direction of a flick is determined based on to which region the touch position by the flick gesture is moved. An input character is confirmed upon detection of the operation of releasing the finger that touched the touch panel (hereinafter referred to as "touch release").

In actual input of Japanese kana characters, methods similar to the above-stated methods are used in some cases. As a specific example, FIG. 11 illustrates a character key 10A corresponding to a line including "あ (a)" in a table of the Japanese kana syllabary when the character key 10A is detected to be touched. In FIG. 11, five regions (hereinafter referred to as "discriminating regions") each corresponding to five characters, "あ (a)," "い (i)," "う (u)," "え (e)," and "お (o)," which are assigned to the character key 10A, are set. In this example, when a user's finger touches the character key 10A, the coordinates of one point P in the touch range is detected as a touch position. In response to the detection, a rectangular discriminating region R0 corresponding to "あ (a)" that is a representative character is set in a wide range including a central portion of the character key 10A. An area around the discriminating region R0 is further sectioned into four regions R1, R2, R3, R4 by diagonal extension lines of this discriminating area R0. The region R1 generated in a leftward direction is set as a discriminating region of "い (i)," the region R2 generated in an upward direction is set as a discriminating region of "う (u)," the region R3 generated in a rightward direction is set as a discriminating region of "え (e)," and the region R4 generated in a downward direction is set as a discriminating region of "お (o)."

An input rule is presented to the user as described below. To input "あ (a)," tap the character key 10A without performing a flick gesture, to input "い (i)," perform a flick gesture in the leftward direction, to input "う (u)," perform a flick gesture in the upward direction, to input "え (e)," perform a flick gesture in the rightward direction, and to input "お (o)," perform a flick gesture in the downward direction.

When the user taps the character key 10A in accordance with the above-described rule, "あ (a)" is selected as an input character by detection of a touch release in the discriminating region R0. When a flick gesture is performed in the leftward direction, "い (i)" is selected by detection of a touch release in the discriminating region R1. When a flick gesture is performed in the upward direction, "う (u)" is selected by detection of a touch release in the discriminating region R2. When a flick gesture is performed in the rightward direction, "え (e)" is selected by detection of a touch release in the discriminating region R3. When a flick gesture is performed in the downward direction, "お (o)" is selected by detection of a touch release in the discriminating region R4.

Thus, without calculating the vector representative of the movement of the finger, a character matched with the movement of the finger can be selected on the basis of in which region the touch release is detected, among the discriminating regions of the characters each set in accordance with the input rule. However, since the coordinates of a touch detection point P change depending on how the user touches the touch panel, an incorrect input character may be selected when the detecting point P is out of the discriminating region of "あ (a)."

FIG. 12 illustrates an example in which a left edge portion of the character key 10A is detected to be touched. In this case, in response to detection of the touch gesture, it is also recognized that the character key 10A corresponding to the line including "あ (a)" is pressed, so that the discriminating regions R0 to R4 are set as in the example of FIG. 11. In this case, the touch detection point P is included in the discriminating region of "い (i)." As a result, when the user taps the character key 10A without performing a flick gesture, a touch release is detected in the discriminating region R1 of "い (i)," and "い (i)" is selected as an input character. In short, in spite of the absence of the flick gesture, it is regarded as if the flick gesture was performed.

In another example, the user performs an upward flick gesture but the amount of movement of the touched point from the detection point P is small. And in this case, a touch release is detected not in the discriminating region R2 of "う (u)" but in the discriminating region R1 of "い (i)." As a result, "い (i)" is selected as an input character. In this case, although an upward flick gesture is made, it is regarded as if a leftward flick gesture was performed. When "う (u)" is not selected because of a small movement amount of the finger in the flick gesture, the user resigned to accept failed selection if the character selected as a result is "あ (a)." However, if a character other than "あ (a)" is selected in this situation, the user is uncomfortable about accepting the resultant selection.

If the discriminating region R0 is set to include the entire character key 10A, the touch detection point P may reliably be included in the discriminating region R0 of "あ (a)." In this case, however, in order to input a character other than "あ (a)," the user needs to make sure to move the finger to the outside of the character key 10A in the flick gesture. Otherwise a desired input is not obtained. This deteriorates the working efficiency and precision in character input operation. The necessity of making careful flick gesture to avoid input errors gives the user stress.

In some input target languages, representative characters are not set for the character keys. In that case, when a touched character key is detected, the discriminating regions of characters assigned to the touched key may be distributed around one point (for example, a central point) within the touched character key. Even in such a case, if the conditions to set the discriminating regions of the characters are fixed, an incorrect character may be selected as in the above-stated examples at the time of selecting the character corresponding to the discriminating region where a touch release is detected as an input character.

One or more embodiment of the present invention correctly select a character, no matter where in a character key a touch is detected, in accordance with change in the position of the touch after that, and to enhance operability in character input.

A character input device according to one or more embodiment of the present invention comprises a computer connected to a touch panel. When a program for an input method editor (IME) is installed on the computer, the computer comprises a defining information storage unit, a discriminating region setting unit, and input character selection unit.

The defining information storage unit stores the defining information used for dividing each character key into a plurality of subregions. For example, the position of each apex of each subregion may be used as the defining information. When each character key is equally divided, a combination of the length and width sizes of each character key or the length and width sizes of one subregion and the number of subregions (number of divisions) may be used as the defining information, for example.

The discriminating region setting unit sets a plurality of discriminating regions to a character key where a touch is detected such that the discriminating regions are distributed based on a position of a subregion that comprises a detection point of the touch. The subregion is one of subregions set based on the defining information relating to the character key and stored in the defining information storage means. Each of the plurality of discriminating regions corresponds to the plurality of characters assigned to the character key.

The input character selection unit selects, as a character to be displayed on the character display area, a character that corresponds to a discriminating region, out of the plurality of discriminating regions set by the discriminating region setting unit, where a touch release was detected after detection of the touch.

According to one or more embodiments of the present invention, discriminating regions corresponding to the characters each assigned to a character key detected to be touched are set based on a position of a subregion where the touch was detected, from among the plurality of subregions generated by virtually dividing the character key. Therefore, the position to set each discriminating region can be changed depending on the touch detection point within the character key, without changing the distribution pattern of each discriminating region. This makes it possible to prevent an incorrect input character from being selected in response to the detection of a touch release.

According to one or more embodiments of the character input device, one of the plurality of characters assigned to each character key is defined as a representative character. The discriminating region setting unit comprises a first setting unit and second setting unit. The first setting unit sets a discriminating region of the representative character that is assigned to the character key detected to be touched, in a range comprising the detection point of the touch, the discriminating region is sized according to one of the plurality of subregions set based on the defining information relating to the character key. The second setting unit sets discriminating regions for characters other than the representative character around the discriminating region set by the first setting unit for the representative character in directions different from each other with respect to the discriminating region of the representative character.

According to one or more embodiments of the present invention, among the plurality of subregions generated by virtually dividing the character key detected to be touched, the subregion comprising the touch detection point is used as a basis of setting the discriminating region for the representative character (for example, "あ (a)"), which is also sized on the basis the subregion. Around this discriminating region, the discriminating regions for characters (for example, "い (i)" "う (u)" "え (e)" and "お (o)") other than the representative character are set. No matter where in the character key a touch is detected, the detection point thereof is always included in the discriminating region of the representative character. Therefore, it becomes possible to prevent a tap gesture for inputting the representative character from being misinterpreted and causing selection of an incorrect character. Since the discriminating region of the representative character can be made sufficiently smaller than the character key based on the subregion comprising the touch detection point, the movement amount of the finger necessary for inputting the characters other than the representative character can be decreased.

The first setting unit may size the discriminating region of the representative character based on the subregion comprising the touch detection point and may set one point within the subregion as a central point of the discriminating region of the representative character.

The first setting unit may set the discriminating region for the representative character by positioning the discriminating region in alignment with the subregion comprising the touch detection point, the discriminating region enclosing the subregion when the discrimination region is positioned in alignment with the subregion. According to this setting, it is possible to set the discriminating region of the representative character in the range that reliably includes the detection point of a touch no matter where the touch is detected. Moreover, the range of setting the discriminating region of the representative character can be identified in each subregion, so that the processing is simplified.

The character input device according to one or more embodiments of the present invention may further include second defining information storage unit that stores defining information relating to setting of the discriminating regions by the first setting unit, for each of the plurality subregions set based on the defining information of the defining information storage unit. In this case, the first setting unit reads the defining information corresponding to the subregion that comprises the touch detection point from the second defining information storage unit, and sets the discriminating region for the representative character based on the read defining information.

According to one or more embodiments of the present invention, the discriminating region for the representative character can be set easily by identifying the subregion that comprises the touch detection point and reading the defining information relating to the subregion and stored in the second defining information storage unit. This also makes it easy to change the conditions to set the discriminating region for each subregion.

In the character input device according to one or more embodiments of the present invention, the discriminating region setting unit sets the plurality of discriminating regions that individually corresponds to the plurality of characters assigned to the character key detected to be touched such that the plurality of discriminating regions are in respective directions different from each other with respect to the subregion that includes the touch detection point. According to the one or more embodiments of the present invention, even when a character key having no representative character set therefor is touched, a touch release can be detected in the discriminating region of a character corresponding to the movement of the finger after the touch. Therefore, it becomes possible to correctly select an input character performed in response to the detection.

According to one or more embodiments of the present invention, even when a plurality of character elements constituting part of a character are assigned to each character key on the keyboard image, the position to set the discriminating region for each character element may be changed depending on the position of a touch detection point as in the case of the character input. This makes it possible to prevent incorrect selection when a character element to be input is selected in response to touch detection.

According to one or more embodiment of the present invention, the position to set a plurality of discriminating regions individually set for a plurality of characters (or character elements) assigned to each of the character keys can be changed depending on a touch detection position, without changing the pattern of distribution of the discriminating regions.

Therefore, no matter where in the character key a touch is touched, the character (or character element) matched with subsequent movement of the finger can correctly be selected and displayed on the touch panel. Moreover, since a target character can be selected without involving a large flick gesture with the finger, character input tasks can efficiently be performed, so that enhanced operability and user-friendliness are achieved.

DETAILED DESCRIPTION

Figure 1:
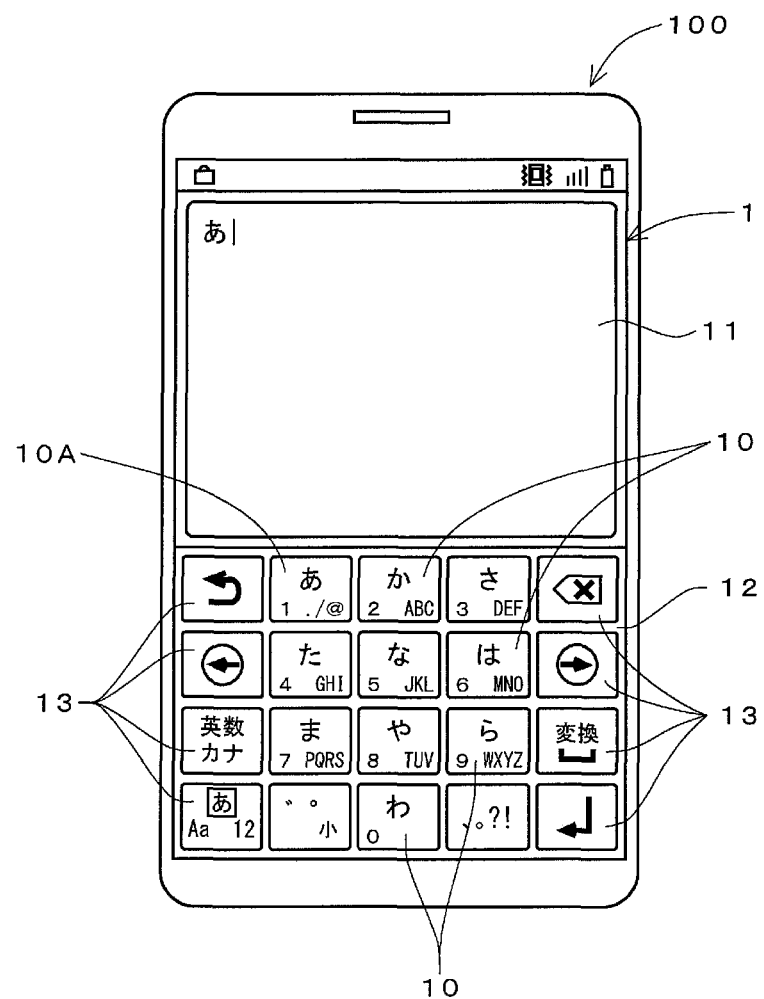
FIG. 1 is a front view illustrating a character input screen of a smartphone to which one or more embodiments of the present invention is applied.

FIG. 1 illustrates a character input screen of a smartphone 100 to which one or more embodiments of the present invention is applied.

The character input screen is displayed on a front touch panel 1, when active applications (such as mailers and Internet browsers) in the smartphone 100 are in the state of accepting character input. The character input screen is divided into two parts. An input character display area 11 is set on an upper part and a keyboard image 12 is placed on a lower part.

The keyboard image 12 comprises twelve character keys 10 arrayed in 4×3 and eight function keys 13 arrayed on both sides of these character keys 10. Among the character keys 10, ten character keys 10 (ten keys) excluding lowermost left and right keys each have a line of kana characters assigned thereto. The kana characters comprise a line including "あ (a)" to a line including "わ (wa)" in a table of the Japanese kana syllabary. A kana character at the top of each line is displayed on each of these ten character keys 10. Among these character keys, a character key representing the line including "あ (a)", which is used to describe the following examples, is designated by numeral 10A.

Numeric characters, alphabetic characters, symbols and the like may also be assigned to each of the character keys 10. The type of characters is switched in response to switching operation. For example, in an alphanumeric input mode, alphabetic characters "A," "B," "C," and a numeric character "2" are allocated to the above-described character key 10A.

Although not illustrated, when a user touches any one of the character keys 10 inside the keyboard image 12 with his or her finger, a guide image is displayed. The guide image may comprise a representative character displayed on the character key 10 (for example, "あ (a)") placed in the center and other four characters arranged on the upper, lower, left and right sides of the representative character. When the user makes a so-called tap gesture, which is to release the finger from the character key 10 without moving the finger, the representative character is selected as an input character. When a flick gesture is made in any one of the upper, lower, left, and right directions, the character associated with the moving direction of the finger is selected as an input character. In all the cases, no detection of the coordinates of the touched point is detected as a touch release. Upon detection of the touch release, an input character is selected and the selected input character is displayed in the input character display area 11.

According to one or more embodiments of the present invention, the character input is activated by performing the process detailed below. When a character key 10 is detected to be touched, the discriminating regions of various characters assigned to the detected character key 10 are set, and a character corresponding to the discriminating region where a touch release is detected after touch detection is selected as an input character. Furthermore, in this example, the position to set each discriminating region is changed depending on the touch detection position, while the discriminating region of the representative character is set to be sufficiently smaller than the character key 10. As a result, the character matched with the actual movement of the finger can correctly be selected.

FIGS. 2 and 3 illustrate how to set the discriminating regions depending on the position of a touch detection point P with the character key 10A corresponding to the line including "あ (a)" as an example. In this example, on the assumption that the character key 10A is vertically and horizontally trisected to set a total of nine subregions r, a subregion r including a touch detection point P is identified, and a discriminating region S0 of a representative character "あ (a)" assigned to the character key 10A is set on the basis of a central point Q within the identified subregion r.

The discriminating region S0 is a rectangular area slightly larger than the subregion r. The discriminating region S0 is positioned with the central point thereof being aligned with the central point Q of the subregion r that includes the touch release detection point P. The surrounding area of the discriminating region S0 is further divided by using diagonal extension lines of the discriminating region S0. A region S1 generated on the left side is defined as a discriminating region "い (i)." A region S2 generated on the upper side is defined as a discriminating region "う (u)." A region S3 generated on the right side is defined as a discriminating region "え (e)." A region S4 generated on the lower side is defined as a discriminating region "お (o)." The discriminating regions S1 to S4 are provided in the range of a preset distance from the discriminating region S0 in advance. The range is not indicated by the extending portions of the diagonal lines of the discriminating region S0 in the drawings.

Figure 2A:
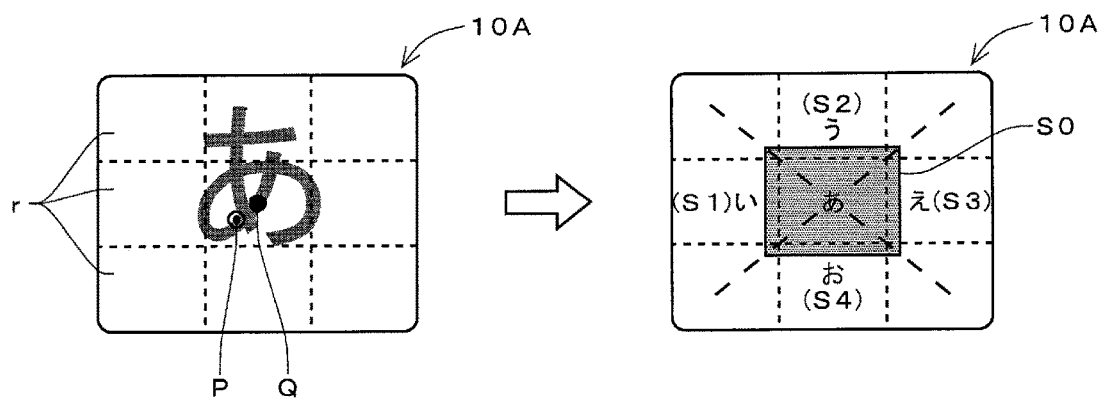
FIGS. 2A-2D are explanatory views illustrating cases of setting discriminating regions depending on the position of a touch detection point P on a character key having a plurality of Japanese kana characters assigned thereto according to one or more embodiments of the present invention.
Figure 2B:
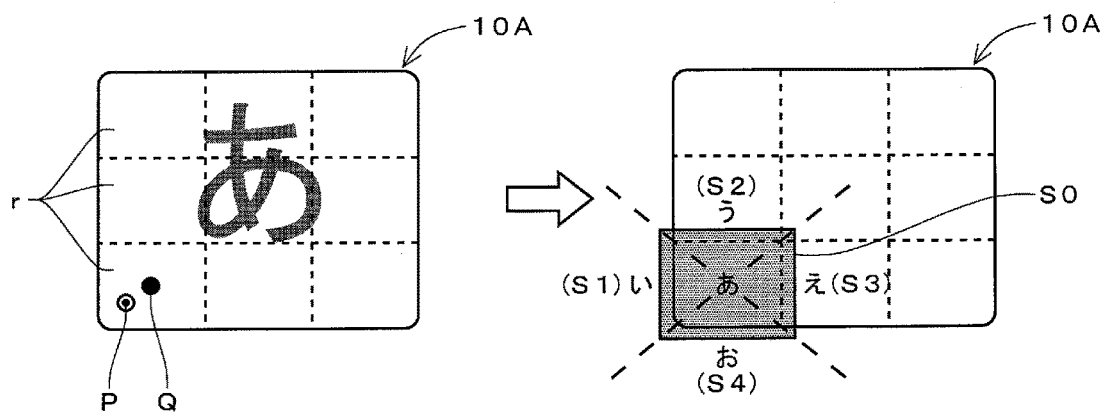
Figure 2C:
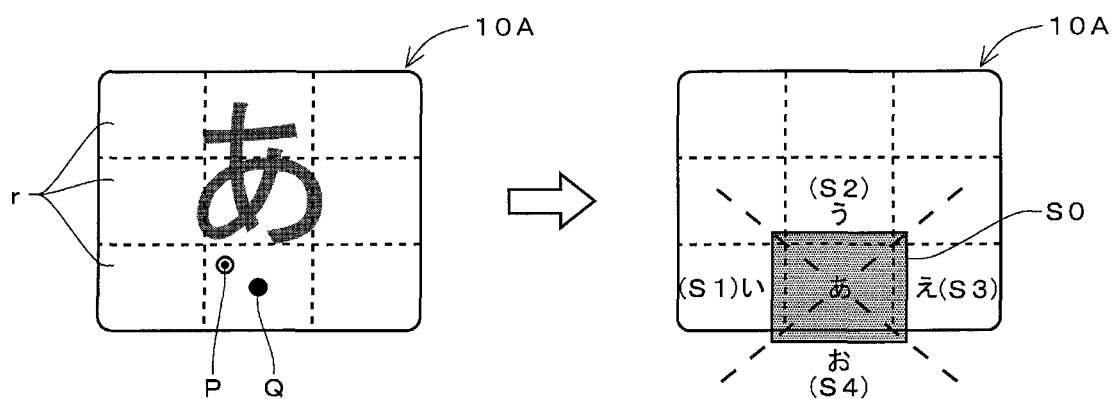
Figure 2D:
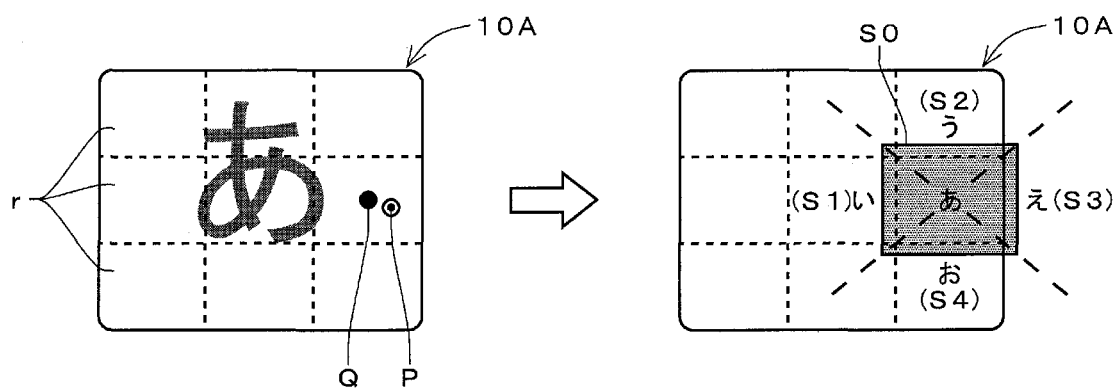

FIG. 2A illustrates an example of setting the discriminating regions S0 to S4 when a touch is detected in the central portion of the character key 10A, and FIGS. 2B-2D illustrate examples of setting the discriminating regions S0 to S4 when a touch is detected at locations away from the central portion of the character key 10A.

As is clear from the examples of FIGS. 2A-2D, when the discriminating region S0 of the representative character is set using the method described above, the discriminating region S0 is set to enclose the subregion r that includes the detection point P no matter where the touch is detected in the character key 10A. Therefore, when a touch release is detected in the vicinity of the point P with almost no movement of the touch point from an original touch position, the representative character "あ (a)" is selected as an input character. When the touch position moves in a specified direction in accordance with a flick gesture and goes into a discriminating region (any one of S1 to S4) positioned in the moving direction, the character corresponding to this discriminating region is selected as an input character.

Figure 3A:
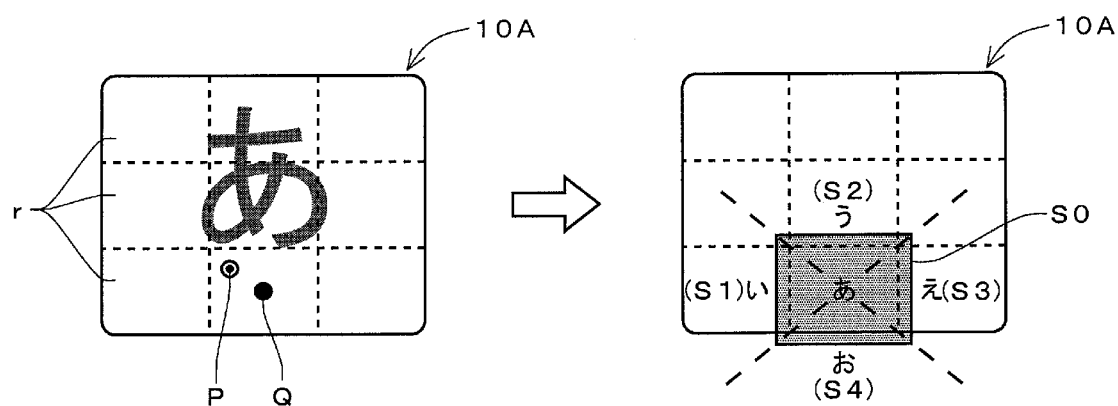
FIGS. 3A and 3B are explanatory views illustrating cases of setting discriminating regions depending on the position of a touch detection point P on a character key having a plurality of Japanese kana characters assigned thereto according to one or more embodiments of the present invention.
Figure 3B:
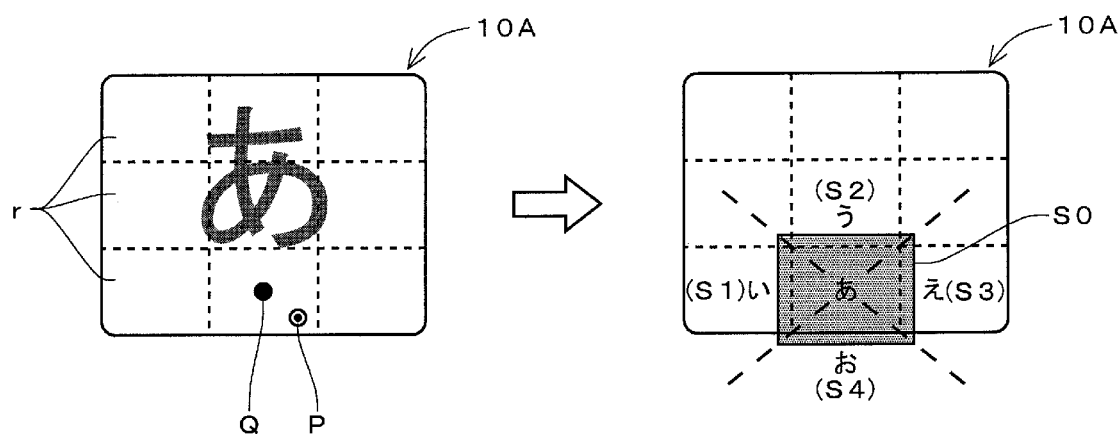

FIGS. 3A and 3B illustrate examples of setting the discriminating regions S0 to S4 with different touch detection points P, which are both included in the same subregion r. The touch detection points P, P in FIGS. 3A and 3B are different, but the discriminating regions S0 to S4 of the respective characters are the same as long as the respective touch detection points P, P are included in the same subregion r. In any case, the discriminating region S0 is made slightly larger than the subregion r, and the central point of the discriminating region S0 is aligned with not the detection point P but the central point Q of the subregion r that includes the detection point P. As a result, the touch detection point P can reliably be included in the discriminating region S0. Since the defining information identifying each subregion r and discriminating region S0 is registered, the subregion r comprising the detection point P can promptly be identified on the basis of the defining information upon detection of the touch, and the discriminating regions S0 to S4 can also be set promptly.

For each of the character keys 10 other than the character key 10A, the discriminating regions S0 to S4 are set in the similar manner (however, in the character keys 10 of the line including "や (ya)" and the line including "わ (wa)," symbols are associated with some of the discriminating regions S1 to S4, and some of the regions are made ineffective). Therefore, no matter which character key 10 is detected to be touched, the detection point P can be included in the discriminating region S0 of the representative character. When a tap gesture is made on the character key 10, the representative character thereof can reliably be selected. Moreover, the discriminating region S0 is made slightly larger than one subregion r, and therefore when the movement amount of the finger in a flick gesture is small, a touch release detection point can easily be put in a discriminating region (any one of S1 to S4) corresponding to the direction of the movement. Therefore, the character matched with the movement of the user's finger can easily be selected with sufficient precision.

Figure 4:
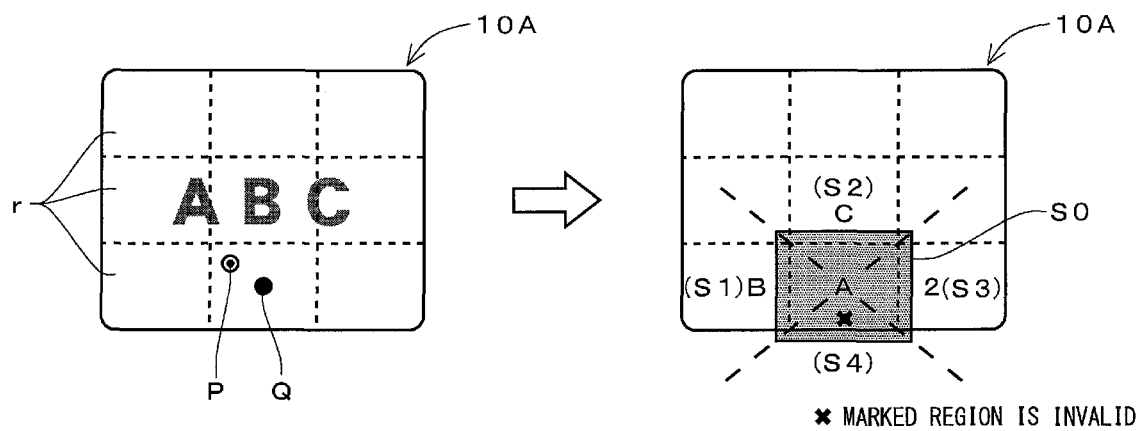
FIG. 4 is an explanatory view illustrating a case of setting discriminating regions depending on the position of the touch detection point P on a character key having a plurality of alphanumeric characters assigned thereto according to one or more embodiments of the present invention.

Even when characters other than kana characters are allocated to each of the character keys 10, the method that is the same as those illustrated in FIGS. 2A-D, 3A, and 3B can be performed. As an example thereof, FIG. 4 illustrates an example of setting the discriminating regions when the character key 10A is detected to be touched in the alphanumeric input mode. In this example, among four characters assigned to the character key 10A, "A" is used as a representative character. Nine subregions r are set on the character key 10A, and the discriminating region S0 of the representative character "A," which is a rectangle slightly larger than one subregion r is set so that the central point thereof is aligned with a central point Q of the subregion r that includes the touch detection point P. The area around the discriminating region S0 is further sectioned into four regions S1 to S4 by diagonal lines of the discriminating region S0. Among these four regions, a left-side region S1 is set as a discriminating region of "B," an upper region S2 is set as a discriminating region of "C," and a right-side region is set as a discriminating region of "2." A lower region S4 is set as an invalid region corresponding to no character. When a touch is detected in a subregion r other than the subregion illustrated in FIG. 4, the discriminating regions S0 to S3 for each of the characters "A," "B," "C," and "2" are set in the same manner as illustrated in FIG. 4.

Figure 5:
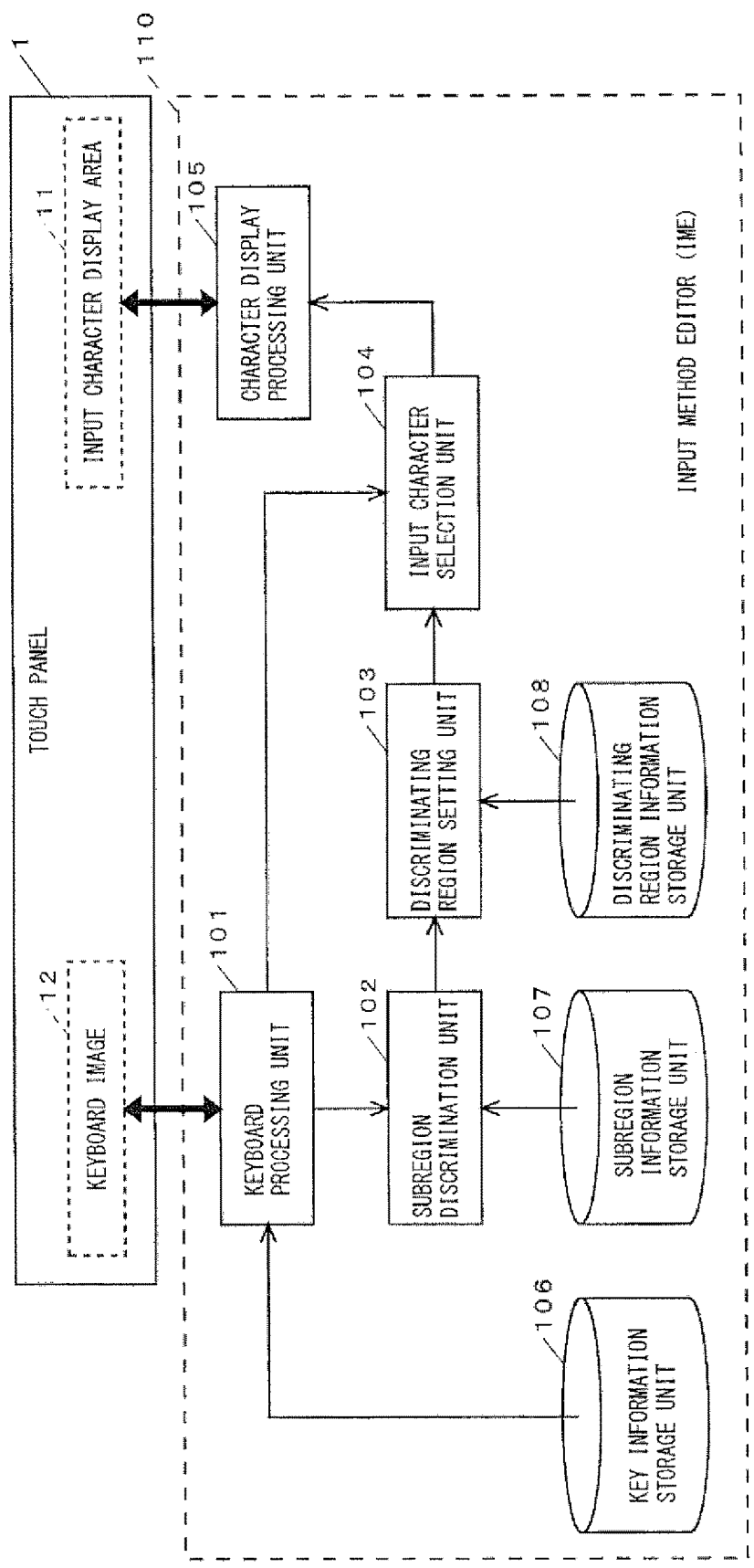
FIG. 5 is a functional block diagram of an input method editor built into the smartphone.

FIG. 5 illustrates the function of the input method editor (IME) 110 that performs the processing illustrated in FIGS. 2 and 3, together with the relationship of the functions with the input character display area 11 and the keyboard image 12 inside the touch panel 1.

An input method editor 110 is a software program built in an unillustrated control unit of the smartphone 100. The input method editor 110 comprises a keyboard processing unit 101, a subregion discrimination unit 102, a discriminating region setting unit 103, an input character selection unit 104, a character display processing unit 105, a key information storage unit 106, a subregion information storage unit 107, and a discriminating region information storage unit 108.

The keyboard processing unit 101 displays the above-mentioned keyboard image 12 on the touch panel 1, and detects a touch and a touch release on/from the keyboard image 12 by using the coordinates of touch points inputted from an unillustrated management system of the touch panel 1.

When a touch on the character key 10 is detected, the subregion discrimination unit 102 and the discriminating region setting unit 103 are operated to set, as illustrated in FIGS. 2 to 4, the discriminating regions S0 to S4 for the characters assigned to the character key 10 detected to be touched. Then, when a touch release is detected by the keyboard processing unit 101, the input character selection unit 104 collates the coordinates of a touch release detection point P with each of the discriminating regions S0 to S4 and selects an input character. The selected character is displayed on the input character display area 11 of the touch panel 1 by the character display processing unit 105.

Information indicating the range of each of the keys 10 and 13 within the keyboard image 12 (for example, coordinates of upper left and lower right apexes of a rectangular region corresponding to the keys 10 and 13) is registered in the key information storage unit 106.

Defining information for individually identifying the respective subregions r of each character key 10 is registered in the subregion information storage unit 107. For example, a combination of the coordinates of upper left and lower right apexes of each subregion r or a combination of the coordinates of the central point of each subregion r and the length and width of each subregion r can be registered.

When the size and the dividing rule of each character key 10 is identical, the defining information common to each character key 10 can be registered in the subregion information storage unit 107 by expressing the coordinates of the apexes of the subregion r or the central point as relative coordinates with respect to a character key 10. Or alternatively, the number of the subregions r or the size of one subregion r may be registered. However, when the dividing rule such as the number of divisions is changed depending on the character keys 10, the defining information on each character key 10 is registered in association with the identification information on each character key 10.

The defining information for setting the discriminating region S0 of the representative character in each subregion r within each character key 10 is registered in the discriminating region information storage unit 108. A character corresponding to each of the discriminating regions S0 to S4 is registered for each character key 10.

As the defining information with respect to the discriminating region S0 of the representative character, the coordinates of upper left and lower right apexes of the discriminating region S0 may be registered for each character key 10 and each subregion r, for example. However, when the size of the discriminating region S0 is constant, defining information common to each subregion r such as a combination of the coordinates of the apexes of the discriminating region S0 relative to the central point of the subregion r and/or a combination of the lengths of horizontal and vertical sides of the discriminating region S0 may be registered.

In addition to the above-stated configuration, the input method editor 110 according to one or more embodiments of the present invention comprises, though not illustrated in FIG. 5, a function of converting a kana character string into a character string of other types of letters, such as a Chinese character, in response to converting operation after the kana character string is identified in response to the operation performed on the character key 10. The input method editor 110 also comprises a function of confirming the character string, which is displayed on the input character display area 11 in an unconfirmed state, in response to confirming operation, and a function of outputting the confirmed character string to the active application.

Figure 6:
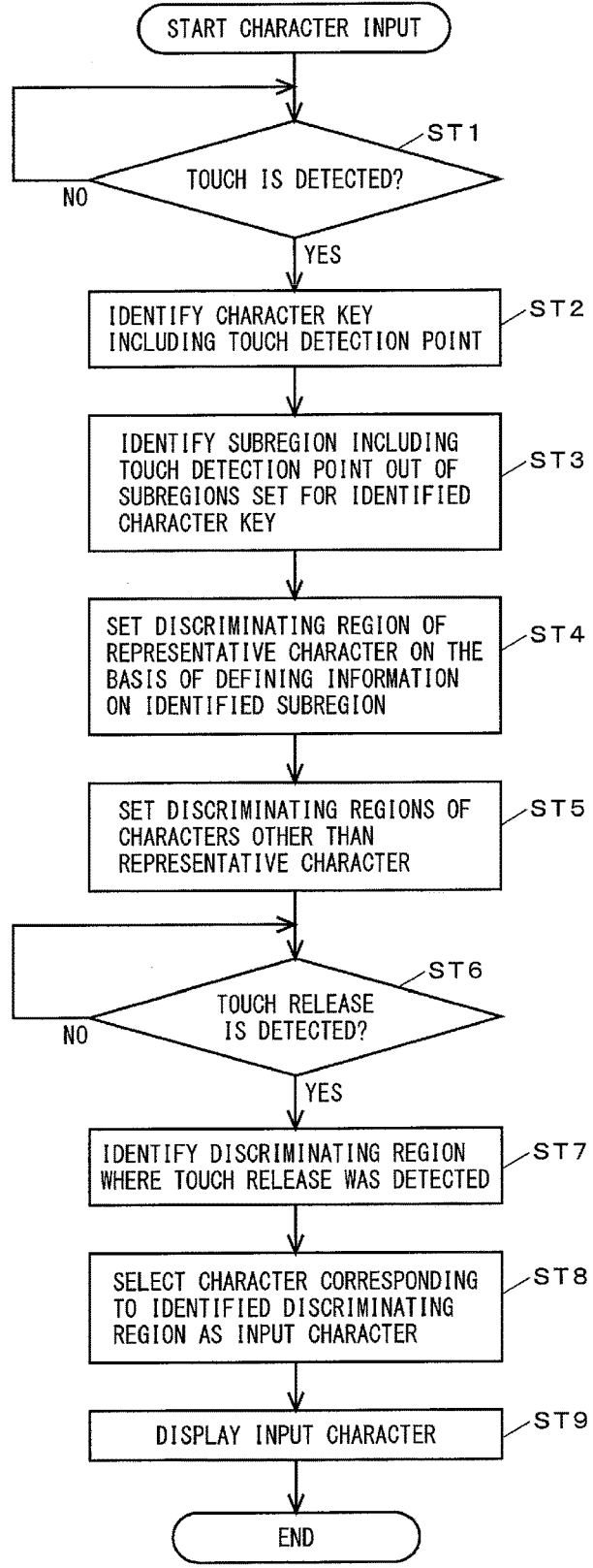
FIG. 6 is a flow chart illustrating processing procedures from reception of the operation performed on a character key to selection of an input character according to one or more embodiments of the present invention.

FIG. 6 illustrates the flow of processing in the above-described input method editor 110 from reception of the operation to be performed on one of the character keys 10 to selection of an input character.

Firstly, when the coordinates of a touched point are input in response to the user touching his/her finger on a target character key 10 on the keyboard image 12, the keyboard processing unit 101 determines that "a touch is detected" ("YES" in step ST1), and collates the input coordinates with the registration information in the key information storage unit 106 to identify the character key 10 detected to be touched (step ST2).

Next, the subregion discrimination unit 102 collates the coordinates of the touch detection point P with the defining information registered in the subregion information storage unit 107 with respect to the character key 10 identified in step ST2, and identifies the subregion r that includes the detection point P (step ST3). Next, the discriminating region setting unit 103 sets the discriminating region S0 of the representative character on the basis of the defining information with respect to the subregion r that includes the detection point P registered in the discriminating region information storage unit 108 (step ST4). The discriminating region setting unit 103 further divides an area around the discriminating region S0 of the representative character by diagonal extension lines of the region S0, and sets discriminating regions S1 to S4 for characters other than the representative character (step ST5). In steps ST4 and ST5, the processing to associate the characters with the respective discriminating regions S0 to S4 is also performed.

Then, when the keyboard processing unit 101 detects a touch release ("YES" in step ST6), the input character selection unit 104 identifies the discriminating region that includes the detection point of the touch release (step ST7), and selects the character associated with the identified discriminating region as an input character (step ST8). The selected character is displayed on the input character display area 11 of the touch panel 1 by the character display processing unit 105 (step ST9), by which the processing is ended.

According to the procedure illustrated in FIG. 6, in any character key 10 within the keyboard image 12, the position of each of the discriminating regions S0 to S4 is changed depending on the position of a touch detection point P, while the distribution pattern of the discriminating regions S0 to S4 is maintained. Accordingly, the character matched with the movement of the user's finger can be selected as an input character as illustrated in FIGS. 2A to 4.

The size of the discriminating region S0 of the representative character set in step ST4 is not limited to a fixed size. The size of the discriminating region S0 may be changed depending on a location of the character key 10 detected to be touched. For example, in the case of the character key 10 placed at the location where the user can easily move his/her finger, the movement amount of the finger in a flick gesture is relatively large. In this case, a larger discriminating region S0 may be set for the representative character. However, in the case of the character key 10 placed at the location where it is difficult for the user to move his/her finger, a smaller discriminating region S0 is desirably set for the representative character.

Within one character key 10, the size of the discriminating region S0 of the representative character can similarly be changed depending on the location of the subregion r that includes the touch detection point P. The size of the subregion r can also be changed for adjusting the size of the discriminating region S0.

Figure 7A:
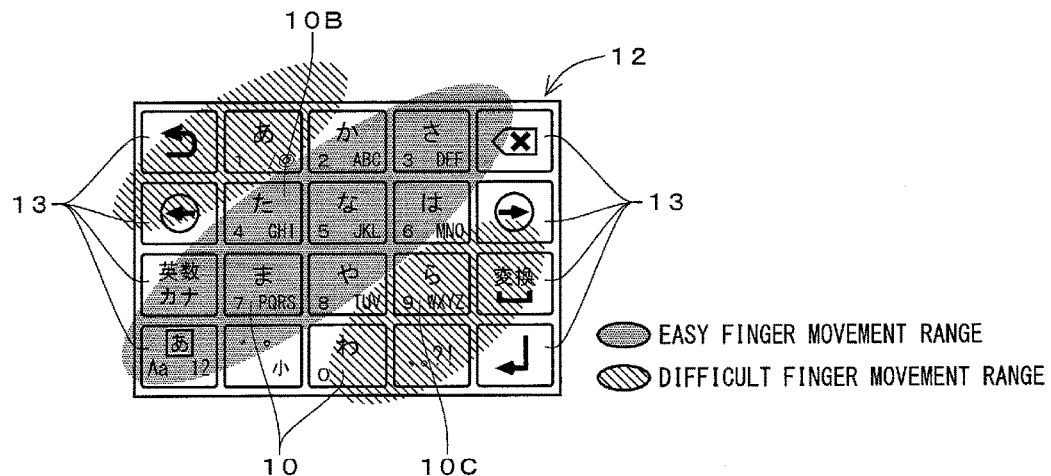
FIGS. 7A-7E are explanatory views illustrating cases of changing the size of the discriminating region of a representative character depending on the location of the character key and/or subregions according to one or more embodiments of the present invention.

FIG. 7A illustrates an easy finger movement range and a difficult finger movement range when a right-handed user holds the smartphone 100 with his or her right hand and touch-operates the keyboard image 12 with the thumb of the right hand.

In FIG. 7A, a character key 10B and a character key 10C on the keyboard image 12 represent a line including "た (ta)" and a line including "ら (ra)," respectively. In the case of the character key 10B representing the line including "た (ta)," although most of the regions of the key are within the easy finger movement range, an upper left apex and the vicinity thereof are within the difficult finger movement range. Contrary to this, in the case of the character key 10C representing the line including "ら (ra)," although most of the regions of the key are within the difficult finger movement range, an upper left apex and the vicinity thereof are within the easy finger movement range.

FIGS. 7B to 7E illustrate examples in which the size of the discriminating region S0 of the representative character is changed depending on the position of the touch detection point P with the above-stated two keys, the character keys 10B and 10C as an example. In these drawings, upper left and lower right subregions are referred to as subregions r1 and r2, respectively. Discriminating regions $S0_1$ and $S0_2$ correspond to the subregions r1 and r2, respectively. The discriminating regions $S0_1$ and $S0_2$ are illustrated in comparison.

Figure 7B:
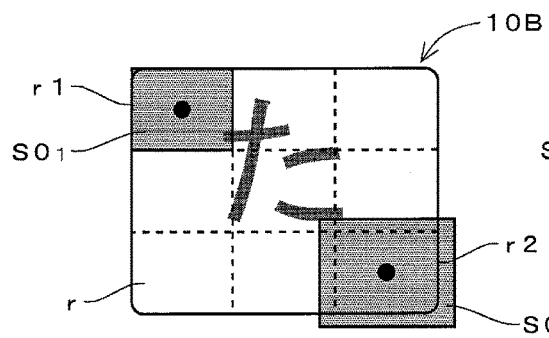
Figure 7C:
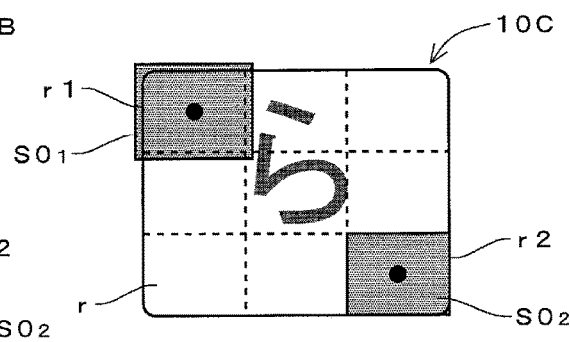

In the examples of FIGS. 7B and 7C, nine subregions r are set by trisecting the character key 10B or 10C in both horizontal and vertical directions. In the character key 10B illustrated in FIG. 7B, the discriminating region $S0_1$ corresponding to the upper left subregion r1, which is within the difficult finger movement range, is reduced to the same size as the subregion r1. The size of the discriminating region $S0_2$ corresponding to the lower right subregion r2 is the same as the size in the examples of FIGS. 2 and 3.

In the character key 10C illustrated in FIG. 7C, the discriminating region $S0_2$ corresponding to the lower right subregion r2, which is within the difficult finger movement range, is reduced to the same size as that of the subregion r2. Although the discriminating region $S0_1$ corresponding to the upper left subregion r1 is larger than that of the subregion r1, the discriminating region $S0_1$ is set smaller than the discriminating region $S0_2$ of FIG. 7B considering that most parts of the character key 10C fall within the difficult finger movement range.

Figure 7D:
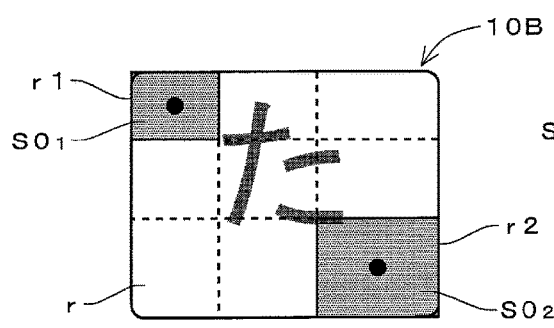

In the character key 10B illustrated in FIG. 7D, each trisecting position is adjusted so that the width of the subregion r becomes gradually larger from the difficult finger movement portion toward the easy finger movement portion both in the vertical and horizontal direction. In each of the subregions r, the discriminating regions S0 identical in size to their corresponding subregions r are set. According to one or more embodiments of the present invention, the discriminating region $S0_1$ corresponding to the upper left subregion r1 can also be made smaller, and the discriminating region $S0_2$ corresponding to the lower right subregion r2 can be made larger.

Figure 7E:
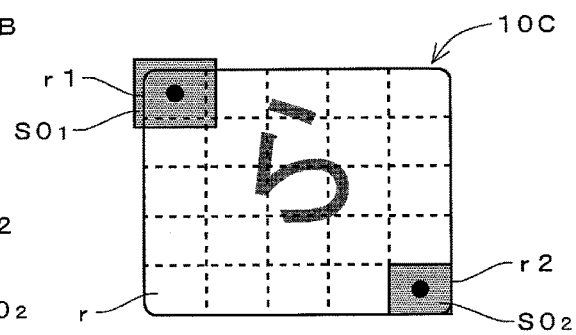

The character key 10C illustrated in FIG. 7E is also equally divided into subregions. Since the number of divisions is five in both the vertical and horizontal directions, a total of twenty five subregions r is set with each of their areas being smaller than that in the previous example. The size of the discriminating region S0 of the representative character is changed depending on the location of the subregion r as in the example of FIG. 7C. In this example, for the lower right subregion r2, which is within the difficult finger movement range, the discriminating region $S0_2$ and the subregion r2 are equal in size. For the subregion r1, which is within the easy finger movement range, the discriminating region $S0_1$ larger than the subregion r1 is set. Both the discriminating regions $S0_1$ and $S0_2$ are set to be aligned with the central point of the corresponding subregions r1 and r2.

As illustrated in the example of FIG. 7E, in the case of the character key 10 positioned at the location where it is difficult to move the finger, the discriminating region S0 of the representative character can be made smaller by increasing the number of divisions and thereby downsizing the individual subregions r. Therefore, it is possible to select an appropriate character in response to slight movement of the finger. Since the touch detection point P is still included in the downsized discriminating region S0, it is possible to select a correct character that is matched with a tap gesture for selecting the representative character.

When the rule of dividing the character key 10 and/or the rule of setting the discriminating region S0 of the representative character are changed depending on easiness in moving the finger as in FIG. 7A-7E, the defining information for right-handed user and the defining information for left-handed user may be registered in the subregion information storage unit 107 and the discriminating region information storage unit 108. In that case, for example, the user is prompted to select one of "input mode for right-handed" and "input mode for left-handed," and the defining information for the selected input mode is made effective.

In each example discussed thus far, it is premised that the character input operation is performed on a vertically-long screen as illustrated in FIG. 1. However, in the case where the screen of the touch panel 1 is switchable to a horizontally-long screen depending on the posture of the smartphone 100, it is desirable to individually register defining information for vertically-long screen and defining information for horizontally-long screen in the subregion information storage unit 107 and the discriminating region information storage unit 108, and to validate the defining information corresponding to the screen on display.

In the horizontally-long screen, the width of the character key 10 becomes long. If the discriminating region S0 of the representative character is also widened accordingly, the movement amount of the finger necessary for moving from the discriminating region S0 to the left and right discriminating regions S1 and S3 becomes larger than the movement amount of the finger necessary for moving to the upper and lower discriminating regions S2 and S4. This may possibly deteriorate the operability. Advantageously, according to one or more embodiments of the present invention, the number of divisions in the horizontal direction may be set larger than the number of divisions in the vertical direction to decrease the difference between the vertical width and the horizontal width of each subregion r, so that the shape of the discriminating region S0 of the representative character is matched with the subregion r. As a result, the movement amount of the finger necessary for moving from the discriminating region S0 to the left and right discriminating regions S1 and S3 can be suppressed.

Additionally, according to one or more embodiments of the present invention, two or more kinds of defining information different in the rule of dividing the character key 10 may be registered in the subregion information storage unit 107. Corresponding to each kind of the defining information in the subregion information storage unit 107, two or more kinds of defining information may also be registered in the discriminating region information storage unit 108, and the user may select the defining information to apply. For example, when a menu "sensitivity adjustment" is presented and high sensitivity is selected, the defining information that makes the sizes of the subregions r and the discriminating region S0 relatively small is made effective. When low sensitivity is selected, the defining information which makes the sizes of the subregions r and the discriminating region S0 relatively large is made effective.

One or more embodiments of the present invention operate on the assumption that the character key 10 detected to be touched is divided into a plurality of subregions r on the basis of the preset defining information, that the discriminating region S0 of the representative character is set with the central point thereof being aligned with the central point of the subregion r that includes the touch detection point P, and that the discriminating region S0 is equal in size to, or slightly larger than, that of the subregion r. However, the present invention is not limited thereto, and the discriminating region S0 of the representative character may be set in alignment with the touch detection point P as a center. Even in this case, the size of the discriminating region S0 is set identical to or slightly larger than one of the subregions r generated by dividing the character key 10. Consequently, no matter where in the character key 10 a touch is detected, the character matched with the movement of the finger can be selected, so that the accuracy and operability of character input can be ensured.

According to one or more embodiments of the present invention, one of a plurality of characters assigned to the character key 10 is used as a representative character, and the discriminating region S0 of the representative character is set within the range that includes the touch detection point P. Around the discriminating region S0 of the representative character, the discriminating regions S1 to S4 for the characters other than the representative character are distributed. However, it is also possible to set the discriminating region of each character on the basis of one point in the subregion r where the touch was detected, without setting the representative character.

Figure 8:
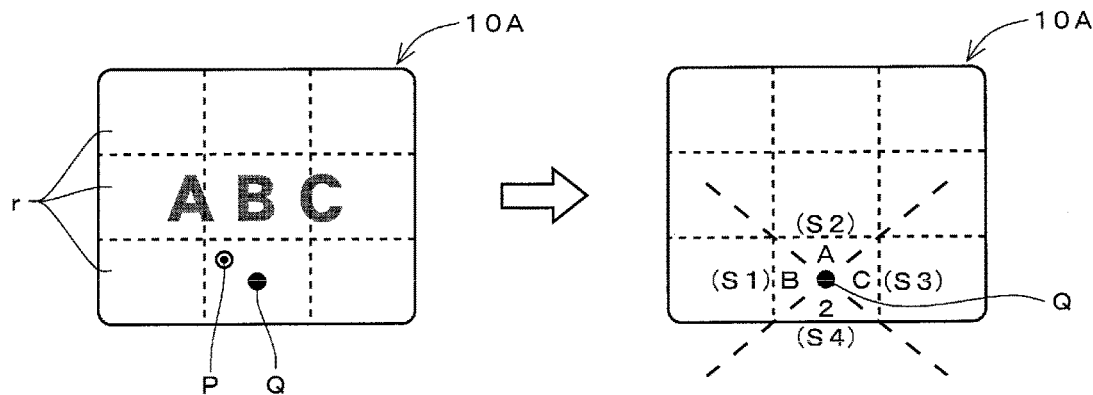
FIG. 8 is an explanatory view illustrating another example of setting discriminating regions of a character key having alphanumeric characters assigned thereto according to one or more embodiments of the present invention.

FIG. 8 illustrates one or more embodiments of the present invention with respect to setting the discriminating regions when a character key 10A is detected to be touched in the alphanumeric input mode. In FIG. 8, the subregion r including the touch detection point P is sectioned into four by diagonal lines of the subregion r to set discriminating regions S1 to S4 corresponding to four characters "A," "B," "C," and "2," which are assigned to the character key 10A. More specifically, the discriminating regions S1 to S4 are each arranged in the direction different from each other with respect to the central point Q within the subregion r where a touch was detected. Even when the touch is detected in a subregion r other than the subregion in the example of FIG. 8, the discriminating regions S1 to S4 for each of the characters "A," "B," "C," and "2" are also set in the same manner as illustrated in FIG. 8.

Figure 9:
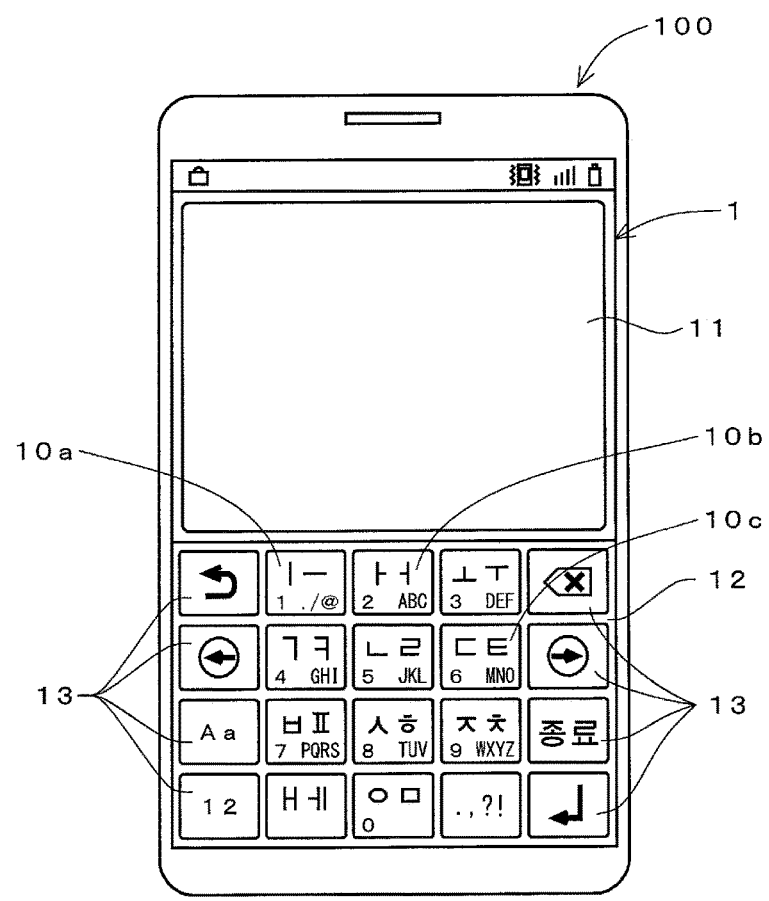
FIG. 9 is a front view illustrating the configuration example of a keyboard image for inputting Korean characters according to one or more embodiments of the present invention.

In the case of inputting characters other than Japanese and English, a keyboard image comprising character keys having character elements assigned thereto may be displayed on the touch panel 1. Each of character elements represents a part of a character. For example, a keyboard image 12 for inputting Korean characters is illustrated in FIG. 9. In the keyboard image 12 of this example, a plurality of Hangul alphabets are each assigned to eleven character keys 10, except for the lowermost right key. In FIG. 9, out of eleven character keys 10, three character keys are designated by reference numerals 10a, 10b, and 10c.

Figure 10A:
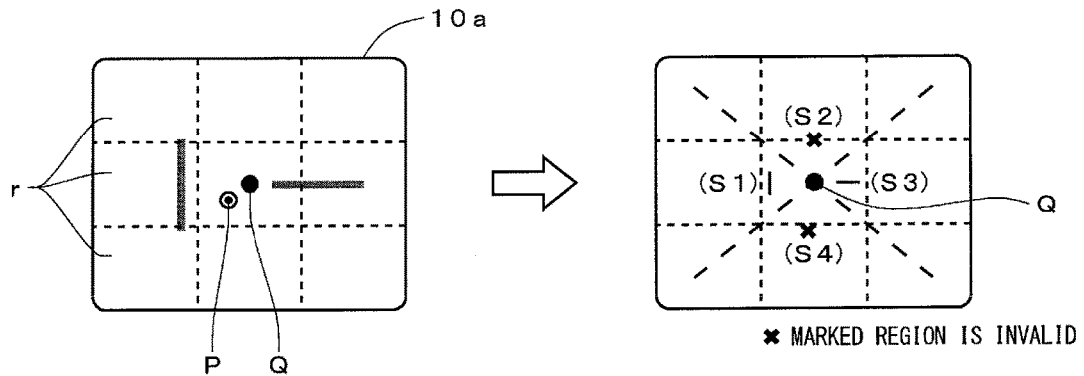
FIGS. 10A-10C are explanatory views illustrating cases of setting discriminating regions for character keys according to one or more embodiments of the present invention.
Figure 10B:
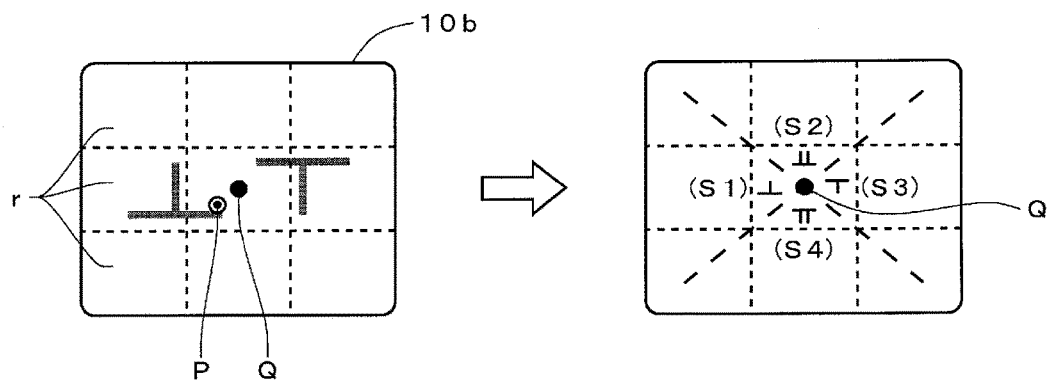
Figure 10C:
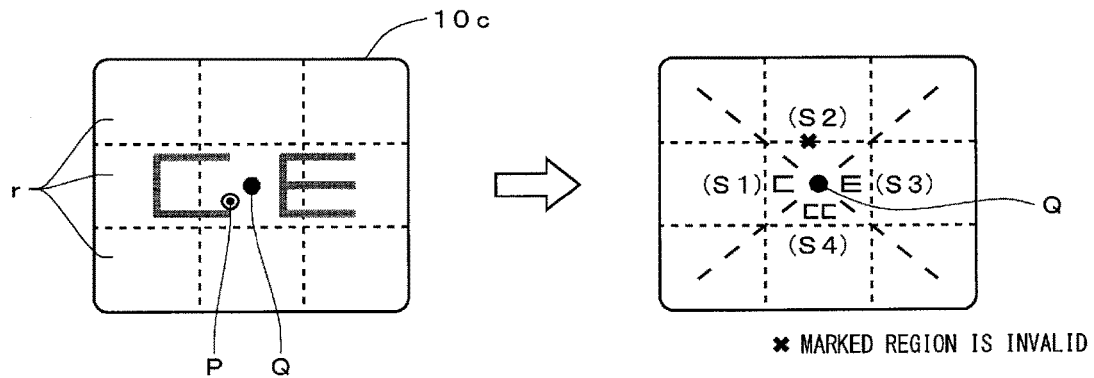
Figure 11:
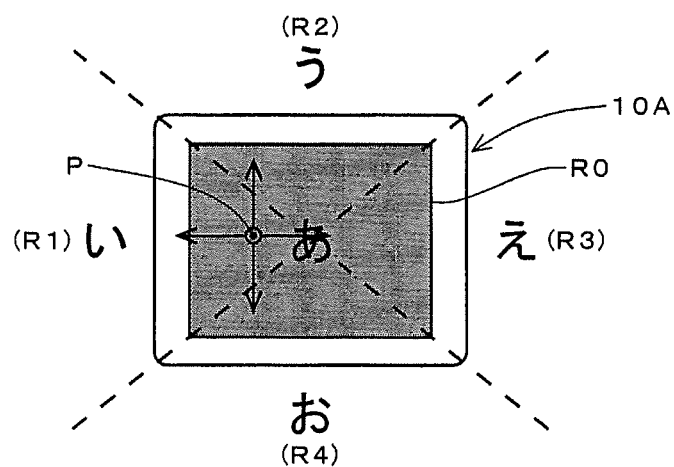
FIG. 11 is an explanatory view illustrating a conventional example relating to setting the discriminating regions of a character key.
Figure 12:
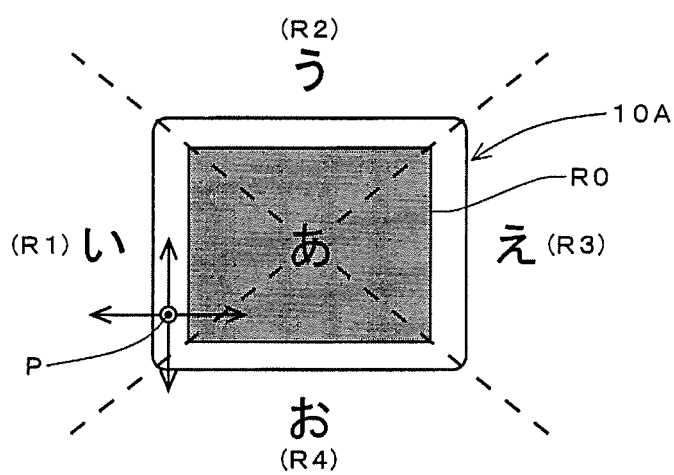
FIG. 12 is an explanatory view illustrating a problem of the conventional example.

FIGS. 10A to 10C illustrate examples of setting the discriminating regions for various assigned Hangul alphabets in the case where the character keys 10a, 10b, and 10c illustrated in FIG. 9 are detected to be touched. In each of the examples, a touch is detected in the central subregion r among the nine subregions r. However, when a touch is detected in other one of subregions r, the same method may also applied.

In each example of FIG. 10, in the character key 10 detected to be touched, the subregion r where the touch detection point P was detected is sectioned into four by the diagonal lines of the subregion r to set discriminating regions S1 to S4 as in the example of FIG. 8.

As illustrated in FIG. 9, each character key 10 has two Hangul alphabets arranged side by side. In conformity with the arrangement of these two Hangul alphabets, the discriminating region setting unit 103 sets a region S1 positioned on the left side of the central point Q of the subregion r that includes the touch detection point P, as a discriminating region for the left Hangul alphabet, out of the two Hangul alphabets displayed on the character key 10. The discriminating region setting unit 103 also sets a region S3 positioned on the right side of the central point Q, as a discriminating region of the right Hangul alphabet, out of the two Hangul alphabets displayed on the character key 10.

When the character key 10 having only two Hangul alphabetic characters assigned thereto (for example, character key 10a) is detected to be touched, the discriminating regions S1 and S3 corresponding to these alphabets are made effective, while the upper and lower discriminating regions S2 and S4 are made ineffective (FIG. 10A).

Among the character keys 10, there are keys to which not only two displayed Hangul alphabets but also Hangul alphabets similar to the displayed alphabets are assigned (for example, the character key 10b), and keys to which synthetic alphabets formed with the displayed Hangul alphabets are assigned (for example, character key 10c). In the case of these character keys 10b and 10c, the discriminating region S1 on the left side is allocated to the left Hangul alphabet, out of two Hangul alphabets displayed on the character key, while the discriminating region S3 on the right side is allocated to the right Hangul alphabet as in the case of the character key 10a. Furthermore, in the case of the character key 10 to which two additional Hangul alphabets are assigned like the character key 10b, the upper discriminating region S2 is allocated to one of these two Hangul alphabets, while the lower discriminating region S4 is allocated to the other Hangul alphabet (FIG. 10B). In the case where one additional Hangul alphabet is preset as in the case of the character key 10c, one of the discriminating regions S2 and S4 is allocated to the Hangul alphabet, while the other discriminating region is set to be ineffective (FIG. 10C).

The input method editor 110 according to one or more embodiments of the present invention as illustrated in the foregoing may be introduced to not only the smartphone 100 but also general information processing devices of the type that enables the touch panel to function as an operation unit and a display unit (including, but not limited to, a remote control, a tablet terminal, a smart television set, and a facsimile machine). As the touch panel becomes larger, character keys to be displayed may become considerably larger than the ball of a finger. In this case, if the discriminating region of the representative character is set in a wide character key range, it becomes necessary to considerably increase the movement amount of the finger in a flick gesture to input a character other than the representative character. However, according to one or more embodiments of the present invention, no matter where in the character key a touch is detected, the discriminating region of each character is set in a small range that includes the detection point.

Therefore, when the representative character is provided for the character key, the representative character can be input by tapping an arbitrary location of the character key. For inputting a character other than the representative character, a target character can also be input by lightly moving the finger from an arbitrary location of the character key in the direction corresponding to the target character. Therefore, it becomes possible to considerably enhance the operability with respect to the large character keys.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A character input device connected to a touch panel, the character input device for setting a keyboard image and an input character display area on the touch panel, the keyboard image including a plurality of character keys each having a plurality of characters assigned thereto; when an initial touch on any one of the plurality of character keys on the keyboard image is detected, for selecting one character out of the plurality of characters assigned to the character key detected to have been touched in accordance with change in a touch position after detection of the initial touch; and for displaying a selected character on the input character display area, the character input device comprising:

a computer programmed to act as:

a defining information storage unit that stores a defining information used to divide each of the plurality of character keys into a plurality of subregions located within the divided character key prior to detection of the initial touch;

a subregion discrimination unit for identifying a subregion including a touch detection point out of subregions set for the character key where the touch is detected, based on the defining information of the character key;

a discriminating region setting unit that sets a plurality of discriminating regions to a character key on which an initial touch is detected such that, both when an identified subregion comprises a central portion of the character key and when the identified subregion does not comprise the central portion of the character key, the discriminating regions are positioned around a center of the identified subregion that further comprises a detection point of the initial touch, the identified subregion is identified by the subregion discrimination unit, each of the plurality of discriminating regions corresponds to the plurality of characters assigned to the touched character key; and an input character selection unit that selects, as the character displayed on the input character display area, a character that corresponds to a discriminating region, out of the plurality of discriminating regions set by the discriminating region setting unit, where a touch release was detected after detection of the initial touch.

2. The character input device according to claim 1, wherein:

one of the plurality of characters assigned to each character key is defined as a representative character, and the discriminating region setting unit comprises: a first setting unit that sets a discriminating region of the representative character that is assigned to the character key detected to have been touched, in a range comprising the detection point of the touch, the discriminating region is sized according to one of the subregions set based on the defining information relating to the touched character key; and a second setting unit that sets discriminating regions for characters other than the representative character, around the discriminating region set by the first setting unit for the representative character in directions different from each other with respect to the discriminating region of the representative character.

3. The character input device according to claim 2, wherein the first setting unit sizes the discriminating region of the representative character based on the subregion comprising the touch detection point and sets one point within the subregion as a central point of the discriminating region of the representative character.

4. The character input device according to claim 2, wherein the first setting unit sets the discriminating region for the representative character by positioning the discriminating region in alignment with the subregion comprising the touch detection point, the discriminating region enclosing the subregion when the discrimination region is positioned in alignment with the subregion.

5. The character input device according to claim 2, wherein:
the character input device comprises a second defining information storage unit that stores defining information relating to setting of the discriminating regions by the first setting unit, for each of the plurality of subregions set based on the defining information of the defining information storage unit, and
the first setting unit reads the defining information corresponding to the subregion that comprises the touch detection point from the second defining information storage unit and sets the discriminating region for the representative character by reading the defining information.

6. The character input device according to claim 2, wherein characters up to five are assigned to each of the plurality of character keys,
the first setting unit sets a rectangular discriminating region of the representative character that is assigned to the character key detected to be touched, the rectangular region being slightly larger than the subregion identified by the subregion discrimination means,
the second setting unit divides the surrounding area of the rectangular discriminating region of the representative character into four areas by diagonal extension lines of the rectangular region, and defines one of the four areas as a discriminating region for each of characters other than the representative character.

7. The character input device according to claim 6, wherein the first setting unit sets the discriminating region of the representative character so that a central point of the region is aligned with a central point of the subregion including the touch detection point.

8. The character input device according to claim 2, wherein
the defining information storage unit stores defining information for changing rules of dividing the character keys depending on the respective positions of the character keys in the keyboard image.

9. The character input device according to claim 2, wherein
the defining information storage unit further stores second defining information for setting the discriminating region of the representative character to each subregion set within each key of the keyboard image,
the first setting unit set the discriminating region of the representative character for the character key where the touch is detected, based on the second defining information set for the subregion identified by the subregion discrimination means.

10. The character input device according to claim 1, wherein the discriminating region setting unit sets the plurality of discriminating regions, each discriminating region corresponds to the plurality of characters assigned to the character key detected to have been touched such that the plurality of discriminating regions are in directions different from each other with respect to the subregion that comprises the touch detection point.

11. The character input device according to claim 1, wherein a center of the plurality of the discriminating regions is centered on the center of the subregion that comprises the detection point of the initial touch.

12. The character input device according to claim 1, wherein each of the plurality of subregions is located entirely within the divided character key.

13. A character input device connected to a touch panel, the character input device for setting a keyboard image and an input character display area on the touch panel, the keyboard image comprising a plurality of character keys each having a plurality of character elements assigned thereto; when an initial touch on any one of the character keys on the keyboard image is detected, for selecting one character element out of character elements assigned to the character key detected to have been touched in accordance with change in a touch position after detection of the initial touch; and for displaying a selected character element on the input character display area, the character input device comprising:
a computer programmed to act as:
a defining information storage unit that stores a defining information used to divide each of the plurality of character keys into a plurality of subregions located within the divided character key prior to detection of the initial touch;
a subregion discrimination unit for identifying a subregion including a touch detection point out of subregions set for the character key where the touch is detected, based on the defining information of the character key;
a discriminating region setting unit that sets a plurality of discriminating regions to a character key on which an initial touch is detected such that, both when an identified subregion comprises a central portion of the character key and when the identified subregion does not comprise the central portion of the character key, the discriminating regions are positioned around a center of the identified subregion that further comprises a detection point of the initial touch, the identified subregion is identified by the subregion discrimination unit, the discriminating regions individually correspond to the plurality of character elements assigned to the touched character key; and
an input character selection unit that selects, as the character element displayed on the input character display area, a character element that corresponds to a discriminating region, out of the plurality of discriminating regions set by the discriminating region setting unit, where a touch release was detected after the detection of the initial touch.

14. The character input device according to claim 13, wherein a center of the plurality of the discriminating regions is centered on the center of the subregion that comprises the detection point of the initial touch.

15. An information processing device comprising:
a touch panel; and
a character input device for setting a keyboard image and an input character display area on the touch panel, the keyboard image comprising a plurality of character keys each having a plurality of characters assigned thereto; when an initial touch on any one of the character keys on the keyboard image is detected, for selecting one character out of the plurality of characters assigned to the character key detected to have been touched in accordance with change in a touch position after detection of the initial touch; and for displaying a selected character on the input character display area, the character input device comprising:
a computer programmed to act as:
a defining information storage unit that stores a defining information used to divide each of the plurality of character keys into a plurality of subregions located within the divided character key prior to detection of the initial touch;
a subregion discrimination unit for identifying a subregion including a touch detection point out of subregions set for the character key where the touch is detected, based on the defining information of the character key;
a discriminating region setting unit that sets a plurality of discriminating regions to a character key on which an initial touch is detected such that, both when an identified subregion comprises a central portion of the character key and when the identified subregion does not comprise the central portion of the character key, the discriminating regions are positioned around a center of the identified subregion that further comprises a detection point of the initial touch, the identified subregion is identified by the subregion discrimination unit, each of the plurality of discriminating regions corresponds to the plurality of characters assigned to the touched character key; and
an input character selection unit that selects, as the character displayed on the input character display area, a character that corresponds to a discriminating region, out of the plurality of discriminating regions set by the discriminating region setting unit, where a touch release was detected after detection of the initial touch.

16. The information processing device according to claim 15, wherein a center of the plurality of the discriminating regions is centered on the center of the subregion that comprises the detection point of the initial touch.

17. The information processing device according to claim 15, wherein each of the plurality of subregions is located entirely within the divided character key.

18. A computer operatively connected to a touch panel and operates as a character input device by a program stored on a non-transitory computer-readable medium, the character input device having functions of: setting a keyboard image and an input character display area on the touch panel, the keyboard image comprising a plurality of character keys each having a plurality of characters assigned thereto; when an initial touch on any one of the character keys on the keyboard image is detected, selecting one character out of the plurality of characters assigned to the character key detected to have been touched in accordance with a change in a touch position after detection of the initial touch; and displaying a selected character on the input character display area, wherein the character input device comprising:
a defining information storage unit that stores a defining information used for dividing each of the plurality of character keys into a plurality of subregions located within the divided character key prior to detection of the initial touch;
a subregion discrimination unit for identifying a subregion including a touch detection point out of subregions set for the character key where the touch is detected, based on the defining information of the character key;
a discriminating region setting units that sets a plurality of discriminating regions to a character key on which an initial touch is detected such that, both when an identified subregion comprises a central portion of the character key and when the identified subregion does not comprise the central portion of the character key, the discriminating regions are positioned around a center of the identified subregion that further comprises a detection point of the initial touch, the identified subregion is identified by the subregion discrimination unit, each of the plurality of discriminating regions corresponds to the plurality of characters assigned to the touched character key;
an input character selection unit that selects, as the character displayed on the input character display area, a character that corresponds to a discriminating region, out of the plurality of discriminating regions set by the discriminating region setting unit, where a touch release was detected after detection of the initial touch.

19. The computer according to claim 18, wherein a center of the plurality of the discriminating regions is centered on the center of the subregion that comprises the detection point of the initial touch.

* * * * *